United States Patent

[11] 3,544,002

[72] Inventors: Raymond E. Summerer
Grand Blanc;
Harold A. Haven, Fenton, Michigan
[21] Appl. No. 865,012
[22] Filed Oct. 9, 1969
[45] Patented Dec. 1, 1970
[73] Assignee General Motors Corporation
Detroit, Michigan
a corporation of Delaware

[54] TAMPER-PROOF ODOMETER
6 Claims, 5 Drawing Figs.

[52] U.S. Cl. ................................................. 235/96
[51] Int. Cl. ............................................ G01c 22/00
[50] Field of Search .................................... 235/95, 96, 117; 116/(Inquire); 74/(Inquire)

[56] References Cited
UNITED STATES PATENTS
1,531,774  3/1925  Whittington ................ 116/114
1,610,639  12/1926  Whittington ................ 116/114
3,137,444  6/1964  Harada ....................... 235/95X
3,482,773  12/1969  Hachtel ...................... 235/95
3,495,773  2/1970  Hachtel ...................... 235/96

Primary Examiner—Richard B. Wilkinson
Assistant Examiner—Stanley A. Wal
Attorneys—Sidney Carter and Peter A. Taucher ABSTRACT: This invention relates to a numbered wheel odometer which provides an indication of tampering and more specifically to an odometer having a pair of spaced-apart transparent concentric cylinders around the numbered wheels, forming a receptacle or chamber between the cylinders. The chamber is filled with a chemical that will cause a visible change if the interior chamber is exposed to the atmosphere after being filled and sealed. The cylinders prevent the use of an instrument on the numbered wheels for rotation thereof other than normal rotation of the odometer during normal driving operation. If the cylinders are broken or penetrated in some manner, there will be a change noted in the odometer to provide a ready indication of tampering. A single tempered glass cylinder could be used, wherein the glass will shatter upon penetration.

Patented Dec. 1, 1970
3,544,002
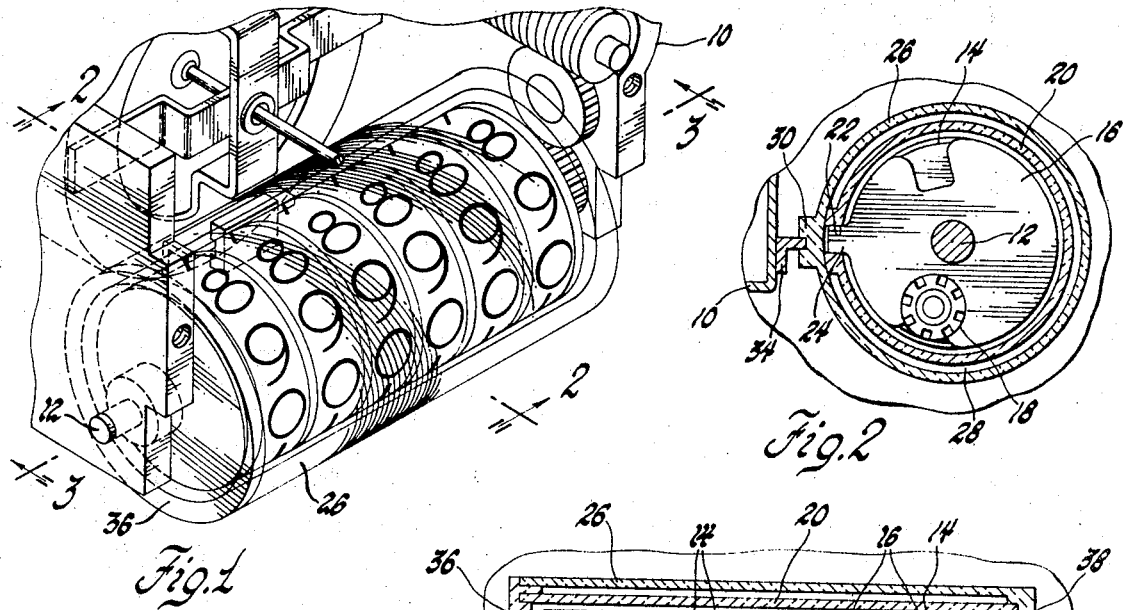
Fig.1
Fig.2
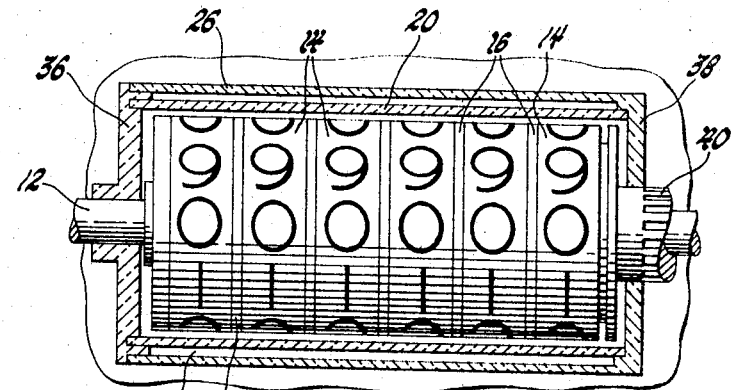
Fig.3
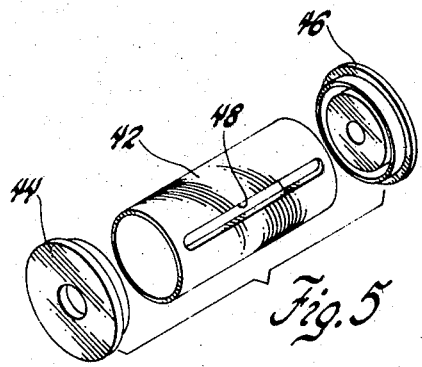
Fig.5
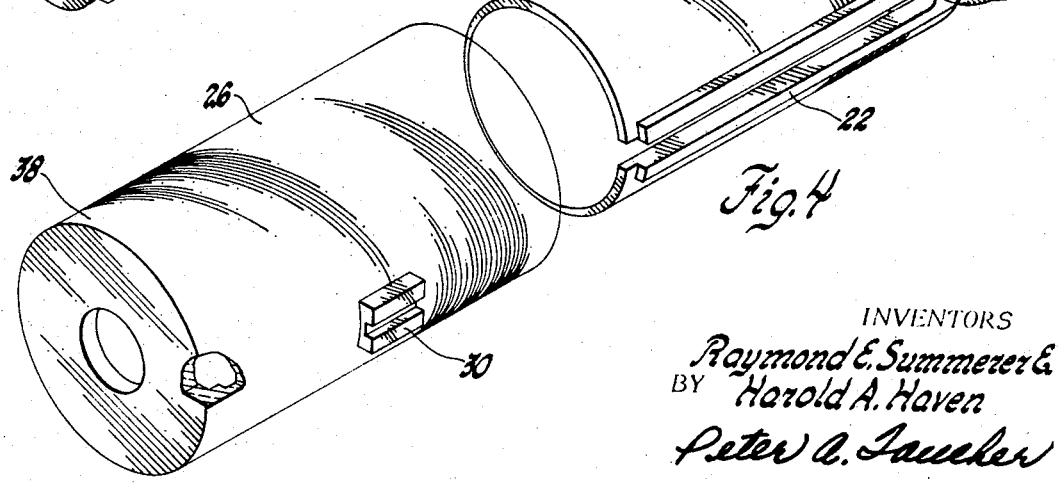
Fig.4
INVENTORS
Raymond E. Summerer &
BY Harold A. Haven
Peter A. Taucher
ATTORNEY

TAMPER-PROOF ODOMETER

The odometer used in this invention is similar to that shown in U.S. Pat. No. 3,137,444. Such an odometer, however, can be tampered with and the reading changed very easily. This is done, for example, by using a sharp tool or pick to separate the numbered wheels from the pinion carrier plates to reach the pinion gears. The pinion gears are rotated and, in turn, rotate the numbered wheels, generally to a lower number, thereby indicating a lower mileage on the automobile than that actually driven. Therefore, an individual purchasing a used automobile may very well be purchasing an automobile that had the odometer reversed to a lesser mileage than that actually driven.

The present invention solves the problem of odometer reversal in that the transparent cylinders enclosing the odometer wheels prevent an instrument from being used to reverse the wheels to show a lesser mileage. Furthermore, if the cylinders are pierced, a ready reference is provided that the odometer had been tampered with.

FIG. 1 is a perspective view of the invention showing an assembled odometer having cylinders mounted around the numbered wheels and being held in operating position in the assembly;

FIG. 2 is a sectional view taken in the direction of arrows 2-2 of FIG. 1;

FIG. 3 is a sectional view taken in the direction of arrows 3-3 in FIG. 1;

FIG. 4 is a perspective view of the cylinders prior to assembly; and

FIG. 5 is a perspective view of a second embodiment of the invention.

Turning now specifically to FIG. 2, there is shown a drive shaft 12 having mounted thereon numbered wheels 14, pinion carrier plates 16, and pinion gears 18. Assembled around the numbered wheels, pinion carrier plates, and pinion gears in a manner to permit rotation thereof is a first transparent cylinder member 20, generally made of plastic or similar material. Cylinder member 20 has a slotted raised portion 22 formed therein to hold the tongues 24 of the pinion carrier plate in a locked configuration. It is understood that an enclosed channel formed on the cylinder or other suitable structure could likewise lock the pinion carrier plates, the locking of the pinion carrier tongues in order for the odometer to work being a well-known expedient in the art. Assembled around the first cylinder member 20 is a second larger transparent cylinder member 26, also generally constructed of plastic or other suitable material, wherein the second cylinder in cooperation with the first cylinder 20 forms a receptacle or chamber 28 between the two cylinders. The first cylinder is prevented from rotating within the second cylinder by being sealed to end plates 36, 38. Other suitable means, such as glue or the like on the slotted raised portion 22 may be used to glue the raised portion to the second cylinder.

As shown in FIG. 3, the first and second cylinders are attached and sealed to a separate end plate 36, while the second cylinder includes an integral end plate 38 to which the first cylinder is sealed. It is understood, however, that both end plates could be made separate.

After the numbered wheels, the pinion carrier plates, and the pinion gears are assembled within the first cylinder and the tongues 24 of the pinion carrier plates are located in the slot on the first cylinder and prior to being surrounded by the second cylinder, the slot is sealed. Sealing of the slot is required to maintain the chamber 28 between the two cylinders.

A second tongue 30 is formed integral with the second cylinder and on the outer surface thereof to serve to lock the entire assembly to the instrument frame as at 34 for normal operation of the odometer.

As is best seen in FIG. 3, the drive shaft 12, as well as the odometer drive gear 40, protrudes through the end plates for easy mounting in the assembly 10. The space between the first cylinder and the numbered wheels is not sealed, and the clearance between the first cylinder and numbered wheels is made large enough to permit easy rotation of the numbered wheels.

Prior to sealing the chamber 28 by closing the end plates, the desired indicating liquid is put into the chamber. The liquid used has the ability to change color when exposed to the atmosphere. As an example, the space 28 may be filled with a highly volatile liquid, such as an ether or alcohol, having some color dye such as copper sulfate dissolved therein. Upon breaking of the second cylinder, the alcohol or ether would evaporate very rapidly, and there would be a change in color from that considered normal when viewing the odometer reading due to the higher concentration of the dye. Another example of a solution or liquid which may be placed in the space 28 would be a paint solvent such as trichloroethylene, chloroform or acetone. Again, upon the first and second cylinder being punctured or broken, the paint solvent would spill onto the numbered wheels and dissolve, or otherwise distort, the paint on the numbered wheels of the odometer. Another example would be to introduce a chemical dye or solution, such as magnesium sulfate, that would, upon being exposed to the atmosphere, produce a cloudy or distorted view to the viewer of the odometer wheels. Many other solutions, etc., could possibly be used, the only requirement being, that they present a distorted image to the viewer.

Another embodiment of may invention shown in FIG. 5 comprises the use of only one cylinder member 42 having end plates 44, 46 with pinion locking means 48 therein and being made of a material that would completely fracture if a sharp instrument penetrated the cylinder. A tempered glass would perform this function. The types of glass that can be used are a sodium glass or flint glass having a highly stressed outer surface.

From the foregoing description, it can be seen that we have provided a rather simple solution to indicate to the driver of an automobile that the odometer had been tampered with. While we have set forth various examples of our invention, the scope thereof is as covered by the claims which follow.

We claim:

1. In a tamper-proof odometer having an assembly of a drive gear, numbered wheels, and restricted pinion carrier plates having pinion gears thereon and being mounted on a shaft with the numbered wheels driven by said drive gear through said shaft and pinion gears wherein the improvement comprises cylinder means around said assembly to prevent said numbered wheels from being driven by means other than normal drive means whereupon there being an attempt made to drive said numbered wheels by other than the normal drive means, said cylinder means will be broken and thereby provide an indication of such an attempt.

2. In a tamper-proof odometer having an assembly of a drive gear, numbered wheels, pinion carrier plates having tongues thereon, and pinion gears mounted on a drive shaft with said numbered wheels being driven by said drive gear through said drive shaft and pinion gears, wherein the invention comprises a first transparent cylinder around said assembly, said first transparent cylinder having a closed channel in said first cylinder to receive and retain said pinion carrier plate tongues in locked engagement, a second larger cylinder mounted around said first cylinder, end plates at each end of said cylinders to concentrically spaced said cylinders to form a chamber therebetween and to provide end seals for said chamber, and means within said chamber to provide an indication of change in said chamber upon a break being made in one of said cylinders.

3. A tamper-proof odometer as set forth in claim 2, wherein the means within said chamber is a paint solvent, whereby upon a cylinder being penetrated, said solvent will spill on and distort the numbers on said numbered wheels.

4. In a tamper-proof odometer as set forth in claim 2, wherein the means within said chamber is a dye that will produce a cloudy surface on said cylinders when air, as when one of said cylinders is penetrated, is introduced in the chamber between said cylinders.

5. A tamper-proof odometer as set forth in claim 2, wherein the means within said chamber is a highly volatile dye solution which will change color when a cylinder is broken and the solution evaporates.

6. In a tamper-proof odometer, the combination comprising an assembly of a drive gear, numbered wheels, pinion carrier plates having tongues thereon and pinion gears mounted on a drive shaft and being driven by said drive gear through said drive shaft and said pinion gears, the improvement comprising, a cylinder around said assembly and having means to lock said tongues on said pinion carrier plates to prevent rotation thereof, said cylinder adapted to shatter upon being punctured by a sharp instrument to provide an indication the odometer has been tampered with.